Patented Feb. 3, 1931

1,791,433

UNITED STATES PATENT OFFICE

HANS SCHMIDT, OF VOHWINKEL, NEAR ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CYANAMIDE-FORMALDEHYDE CONDENSATION PRODUCT AND PROCESS OF MAKING SAME

No Drawing. Application filed July 11, 1928, Serial No. 292,012, and in Germany September 10, 1924.

The present invention relates to new compound derived from cyanamide and to a process of preparing the same.

I have found that a new condensation product of cyanamide and formaldehyde is obtainable by causing cyanamide to react with formaldehyde in an acid reacting medium. I prefer to carry out my new process in an aqueous solution and particularly use as starting material an aqueous extract of crude calcium cyanamide.

The following example will illustrate my invention, without limiting it thereto:

Example 1.—An extract of crude calcium cyanamide obtained in the customary manner by treatment with water and containing 80 parts by weight of cyanamide, is slightly acidified by the addition of dilute hydrochloric acid. 215 parts by weight of a 40 per cent formaldehyde solution are then added, and the mixture is heated on the water-bath for several hours, until the condensation product separates in an amorphous state. After cooling, filtering and washing the resulting product forms an amorphous powder. On heating it decomposes at 250° C., giving off gas; it is only slightly soluble in cold dilute hydrochloric acid and in dilute caustic alkali.

An analysis shows that the reaction product contains only a very small quantity of calcium and that on the other hand the whole amount of cyanamide used, according to the example, has entered into the reaction product.

I claim:

1. The process which comprises causing formaldehyde to act on cyanamide in aqueous solution containing a strong mineral acid while heating, until the condensation product separates in an amorphous state.

2. The process which comprises adding formaldehyde to an aqueous extract of crude calcium cyanamide, acidified by a strong mineral acid, and heating the mixture for several hours, until the condensation product separates in an amorphous state.

3. The process which comprises adding dilute hydrochloric acid to an aqueous extract of crude calcium cyanamide containing about 80 parts by weight of cyanamide, until the reaction mixture shows a slightly acid reaction, adding 215 parts by weight of a 40% formaldehyde solution and heating the mixture for several hours on the water bath, until the condensation product separates in an amorphous state.

4. The new condensation product of cyanamide with formaldehyde which is obtainable by reacting upon cyanamide with formaldehyde in a mineral acid aqueous solution while heating, until the condensation product separates, said product being an amorphous powder which decomposes on heating with gas evolution, being slightly soluble in cold dilute hydrochloric acid and in dilute caustic alkali solution.

In testimony whereof I have hereunto set my hand.

HANS SCHMIDT. [L. S.]